INVENTOR
Kenneth Bradshaw

April 14, 1970  K. BRADSHAW  3,505,898
STEERING GEAR ASSEMBLY
Filed Sept. 12, 1968  2 Sheets-Sheet 2

INVENTOR
Kenneth Bradshaw

BY  ATTYS.

United States Patent Office

3,505,898
Patented Apr. 14, 1970

3,505,898
STEERING GEAR ASSEMBLY
Kenneth Bradshaw, Clifton, England, assignor, by mesne assignments, to Cam Gears, Ltd., Hitchin, England, a British company
Filed Sept. 12, 1968, Ser. No. 759,271
Claims priority, application Great Britain, Sept. 12, 1967, 41,500/67
Int. Cl. B62d 1/20
U.S. Cl. 74—498                               10 Claims

ABSTRACT OF THE DISCLOSURE

A rack and pinion steering gear assembly in which the rack bar is carried for longitudinal movement in a rack bar housing by means of a bushing mounted in the housing. The bushing includes a radial slot in which is disposed a plastic bushing which bottoms at opposite ends on the rack bar and on the inside surface of the rack bar housing to apply a radial force on the rack bar to dampen out shock forces which may emanate from the steered wheels and which may cause rattle of the rack bar.

BACKGROUND OF THE INVENTION

This invention relates generally to steering systems and more particularly to rack and pinion steering gear assemblies.

The rack bar of a rack and pinion steering gear assembly is generally carried for reciprocal movement in a rack bar housing. The rack bar is subjected to impact or shock forces which emanate from the steered wheels to which the steering gear assembly is connected. Such shock forces tend to shake or vibrate the rack bar in a radial direction in the rack bar housing which causes a rattle or knocking of the rack bar, particularly in the area of the rack bar remote from its associated pinion.

SUMMARY OF THE INVENTION

An object of the invention is to dampen out the shock forces emanating from the steered wheels to eliminate the knock or rattle of the rack bar. To this end the present invention comprises one or more bushings mounted in the rack bar housing, each of which is formed with a bore extending therethrough for receiving the rack bar in longitudinal sliding relation and each which further comprises an insert extending into the bore and biased radially into pressing engagement with th rack bar to apply a radial force thereto. The insert is formed of resilient material and the radial force which is applied by the insert to the rack bar eliminates knocking or rattling of the rack bar.

In the preferred form of the invention the inserts are constructed of polyurethane. Each of the inserts is disposed within a slot formed in its respective bushing and extending radially through the wall thereof. The insert is deformable from a free state configuration in which it assumes the shape of a parallelepiped to a stressed state configuration in which it is shaped arcuately. The free state configuration of the insert obtains when the bushing is in an unassembled condition, and the stressed state configuration obtains when the bushing is mounted in the rack bar housing and the rack bar is inserted into the bore of the bushing, whereupon the radially inner end of the insert bottoms on the rack bar and the radially outer end presses hard against the inside surface of the rack bar housing to deform the insert into the stressed state configuration thereof.

The bushing may comprise more than one insert spaced circumferentially about the periphery of the bushing. Longitudinally extending flutes may also be formed in the periphery of the bushing to enable fluid such as lubricating oil to move back and forth across the bushing within the rack bar housing.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

DESCRIPTION OF THE PREFERRED EMBODIMENTS

Figure 1:
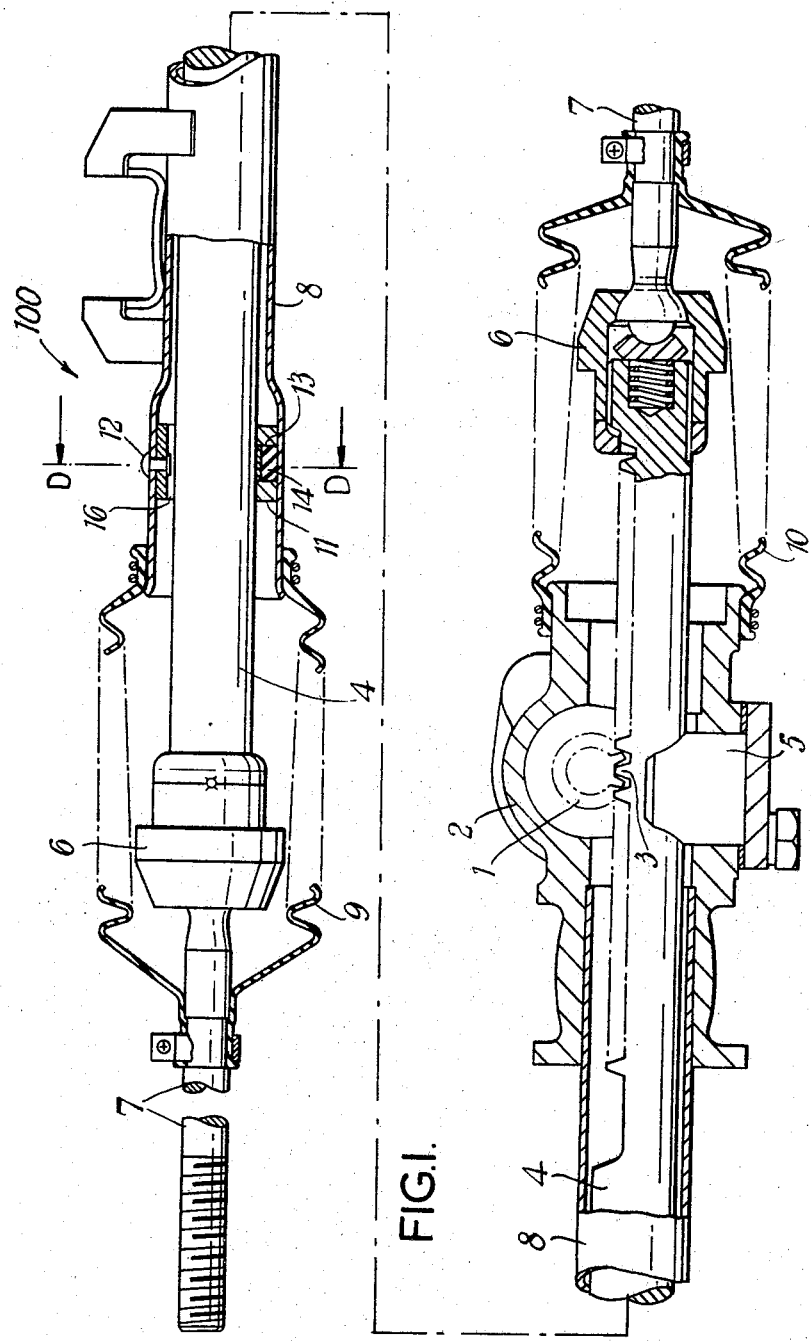
FIGURE 1 is a longitudinal sectional view of a rack and pinion steering gear assembly constructed in accordance with the principles of the present invention, portions thereof being shown in elevation.
Figure 2:
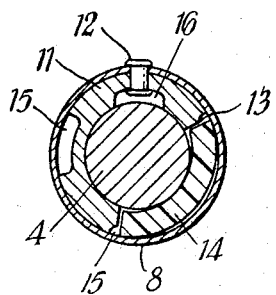
FIGURE 2 is a cross sectional view taken substantially along line D—D of FIGURE 1.
Figure 3:
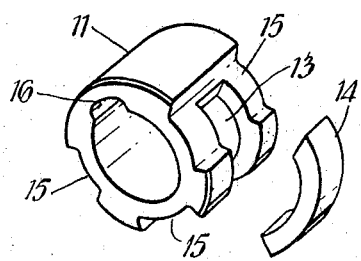
FIGURE 3 is an exploded view of the rack bar bushing.

Referring to FIGURES 1-3, a rack and pinion steering gear assembly constructed in accordance with the principles of the present invention is indicated generally at reference numeral 100 and comprises a pinion 1 mounted in a pinion housing 2 and operatively engageable with a rack 3 of a rack bar 4. The illustrated embodiment of the rack bar 4 is cylindrically shaped and is disposed within a tubular rack bar housing 8. A portion of the rack bar 4 extends into the pinion housing 2 and is axially slidably supported on a yoke 5. The distal ends of the rack bar 4 are connected through couplings 6 to a pair of tie rods 7 for moving the steered wheels, as will be understood by those skilled in the art.

In the illustrated embodiment the rack bar housing 8 is connected at one end in fixed and sealed assembly to the pinion housing 2 and at its other end to a bellows 9. That portion of the rack bar 4 which projects from the pinion housing 2 on a side opposite the bellows 9 is enclosed in a bellows 10 which extends between the pinion housing 2 and the adjacent tie rod 7. As a consequence, the rack bar 4 is enclosed within a sealed chamber along its entire length.

Located in the rack bar housing 8 adjacent the end thereof remote from the pinion housing 2 is a metallic bushing 11 which is centrally apertured to encircle the rack bar 4 and through which the rack bar 4 is slidable in a longitudinal or axial direction. The bushing 11 is enclosed within a diametrically enlarged portion of the rack bar housing 8 and is fixedly secured thereto by means of a suitable fastening device such as a rivet indicated at reference numeral 12.

Located in and extending radially through the wall of the bushing 11 for a portion of its circumferential extent is an arcuately formed slot 13 which provides an arcuate insert housing for an insert 14. The insert 14 is preferably of resilient plastic material and may be constituted of polyurethane, for example.

In a free state configuration the insert 14 assumes the shape of a parallelepiped but in a stressed state configuration assumes an arcuate shape. In FIGURE 3 the insert 14 is shown in its stressed state configuration to illustrate the curvature thereof when the bushing 11 is assembled in the rack bar housing 8.

Accordingly, when the insert 14 is disposed within the slot 13 and the bushing 11 is assembled in the rack bar housing 8 with the bar 4 extending therethrough the insert 14 is stressed or deformed into the arcuate shape thereof shown in FIGURES 1-3 by virtue of radially directed forces acting between the outer surface of the rack bar 4, against which one side of the insert 14 bottoms, and the inside surface of the rack bar housing 8, against which the other side of the insert 14 bottoms, to exert a radial pressure on the rack bar 4, which pressure serves to dampen out shock forces emanating from the steered wheels and to considerably reduce or eliminate rattle or knock of the rack bar 4.

The closed chamber provided by the rack bar housing 8 and the bellows 9 and 10 within which the rack bar 4 is disposed is generally filled with oil. To permit passage of the oil (and air that may be within the closed chamber) between the bellows 9 and 10 and across the bushing 11 during operation of the assembly 100, a series of circumferentially spaced axially extending flutes 15 are formed in the periphery of the bushing 11 and an internal flute 16 is formed in the inner wall thereof.

Figure 4:
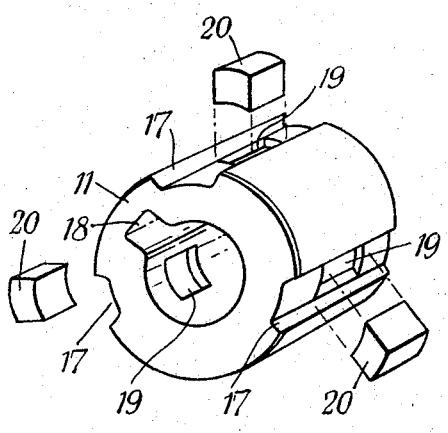
FIGURE 4 is an exploded view of another form of the rack bar bushing.
Figure 5:
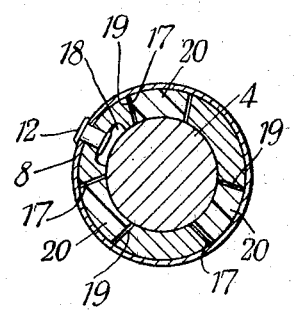
FIGURE 5 is a cross sectional view similar to that shown in FIGURE 2 but including the embodiment of the bushing shown in FIGURE 4.

In the form of the invention illustrated in FIGURES 4 and 5 wherein the external and internal flutes are indicated at reference numerals 17 and 18 respectively, a radial slot 19 corresponding to the slot 13 shown in FIGURES 1-3 opens to each of the flutes 17 and 18. A resilient insert 20 is disposed in each of the slots 19, which insert assumes the shape of a parallelepiped when in an unstressed condition and an arcuate shape when subjected to stress in the assembled condition thereof as shown in FIGURE 5. In this form of the invention the rack bar 4 is subjected to a snug pressing engagement by each of the inserts 20, the circumferential spacing of which inserts provides an improved shock force dampening effect.

Although minor modifications might be suggested by those versed in the art, it should be understood that I wish to embody within the scope of the patent warranted hereon all such modifications as reasonably come within the scope of my contribution to the art.

I claim as my invention:

1. A rack and pinion steering gear assembly comprising:
   a rack bar housing,
   an elongated rack bar in said housing,
   means for moving said rack bar longitudinally in said housing including a pinion in association therewith,
   a bushing in said housing having means forming an aperture longitudinally therethrough for receiving said rack bar in sliding relation therewith, and
   means including an insert mounted in said bushing and biased into pressing engagement with said rack bar for providing a radial pressure thereon to dampen shock forces which may emanate from the steered wheels and cause rattle of the rack bar.

2. The assembly as defined in claim 1 wherein said insert is made of resilient material for providing its own biasing force.

3. The assembly as defined in claim 2 wherein said insert is made of polyurethane.

4. The assembly as defined in claim 2 wherein said housing and said bushing comprise adjacent cylindrical wall surfaces and wherein said bushing further comprises an insert-receiving slot extending radially therethrough and opening to said cylindrical wall of said surfaces,
   said insert being constructed and arranged so that the insert is urged against the cylindrical wall surface of the housing and deformed from a free state configuration to a stressed state configuration for applying said radial pressure on said rack bar.

5. The assembly as defined in claim 1 including:
   means forming a longitudinal flute in the periphery of said bushing to enable fluid to move longitudinally across said bushing.

6. The assembly as defined in claim 1 and including fastening means for connecting said bushing fast to said rack bar housing.

7. The assembly as defined in claim 1 wherein said rack bar moving means further comprises a housing for carrying said pinion,
   said pinion housing and said rack bar housing being interconnected with one another.

8. In a rack and pinion steering gear assembly including an elongated rack bar, a tubular housing for the rack bar and a pinion associated therewith for moving the rack bar longitudinally within the housing, the improvement of means for dampening out shock forces which may emanate from the steered wheels comprising:
   a cylindrical bushing disposed within the rack bar housing and centrally apertured to receive the rack bar in sliding bearing relation,
   means forming at least one circumferentially extending radial slot in said bushing opening at the inner end thereof to said aperture, and
   means including at least one plastic insert in said slot biased radially against the rack bar.

9. The assembly as defined in claim 8 wherein said slot opens at its outer end to the inside surface of said rack bar housing and said insert bottoms at one end on said rack bar and at an opposite end on said inside surface.

10. The assembly as defined in claim 8 and including a plurality of said slots and inserts spaced circumferentially around said bushing.

References Cited

UNITED STATES PATENTS 1,483,903   2/1924   Masury _____ 74—490 X
3,157,061   11/1964   Parker _____ 74—498

MILTON KAUFMAN, Primary Examiner

U.S. Cl. X.R.

74—422, 490